(12) United States Patent
Foss (10) Patent No.: US 7,051,599 B2
(45) Date of Patent: May 30, 2006

(54) THERMAL TRANSIENT ANEMOMETER HAVING SENSING CELL ASSEMBLY

(75) Inventor: John F. Foss, East Lansing, MI (US)

(73) Assignee: Board of Trustees Operating Michigan State University, East Lansing, MI (US)

( * ) Notice: Subject to any disclaimer, the term of this patent is extended or adjusted under 35 U.S.C. 154(b) by 0 days.

(21) Appl. No.: 10/978,629

(22) Filed: Nov. 1, 2004

(65) Prior Publication Data

US 2006/0090573 A1    May 4, 2006

(51) Int. Cl.
*G01P 5/06* (2006.01)
*G01F 1/68* (2006.01)
*G01F 1/708* (2006.01)

(52) U.S. Cl. ............................... 73/861.85; 73/204.14; 73/861.95

(58) Field of Classification Search .............. 73/118.1, 73/204.27, 204.25, 204.14, 861.85, 861.95; 340/438, 439; 374/145
See application file for complete search history.

(56) References Cited

U.S. PATENT DOCUMENTS

| | | | |
|---|---|---|---|
| 3,603,147 A * | 9/1971 | Dorman | 73/204.14 |
| 3,687,130 A * | 8/1972 | McCormick | 73/204.27 |
| 4,043,196 A * | 8/1977 | Trageser | 73/204.14 |
| 4,074,566 A * | 2/1978 | Obayashi et al. | 73/204.27 |
| 4,335,616 A * | 6/1982 | Oliva et al. | 73/861.95 |
| 4,501,145 A | 2/1985 | Boegli et al. | |
| 4,587,842 A * | 5/1986 | Handtmann | 73/204.14 |
| 5,117,691 A | 6/1992 | Fraser | |
| 5,394,746 A | 3/1995 | Williams | |
| 5,537,871 A | 7/1996 | Itsuji et al. | |
| 5,654,507 A | 8/1997 | Hicks et al. | |
| 6,318,168 B1 | 11/2001 | Chidley et al. | |
| 6,453,739 B1 | 9/2002 | Saikalis et al. | |
| 6,470,741 B1 | 10/2002 | Fathollahzadeh | |
| 6,763,711 B1 | 7/2004 | Nair et al. | |
| 6,772,627 B1 * | 8/2004 | Fleming | 73/147 |

* cited by examiner

*Primary Examiner*—Harshad Patel
(74) *Attorney, Agent, or Firm*—Brinks Hofer Gilson & Lione (57) ABSTRACT

A thermal transient anemometer provides mass flow rate or volume flow rate over smaller discrete regions of a larger flow field, i.e., the distribution of such rates over a predefined, larger area. The thermal transient anemometer comprises two components: a frame with a plurality of sensing cells each having a resistance wire grid and a control unit which includes an energy source which heats the resistance wire grid of each cell, measurement circuitry for determining the decay of resistance of the grid wires as they cool and computational circuitry which determines the mass or volume flow rate through each cell based upon such decay function.

20 Claims, 8 Drawing Sheets

THERMAL TRANSIENT ANEMOMETER HAVING SENSING CELL ASSEMBLY

BACKGROUND OF THE INVENTION

The invention relates generally to an apparatus and method for measuring the mass or volume flow rate of a fluid across or through one or more regions of a fluid flow field.

"Anemos" the Greek word for wind, has as a logical extension: the word "anemometer" which identifies a device for measuring air, or more broadly, fluid velocity. Typically, an anemometer is utilized to measure fluid velocity for a spatial domain that is small enough to be characterized as a fluid dynamic point. Various devices such as thermocouples and thermistors which utilize physical temperature/electrical resistance relationships provide highly accurate fluid dynamic point measurements. By way of contrast, a flow meter, frequently a mechanical device with an electromechanical transducer, is utilized to measure the entire mass or volume flow rate in a conduit, pipe or duct.

There is also a need to determine mass or volume flow rates across or through several smaller regions of a larger field of flow, i.e., a situation intermediate the two above-noted measurement approaches of point and total flow. Here, a plurality of small area, i.e., cell, sensors are arrayed across a larger flow field and each cell sensor provides data regarding the specific flow rate therethrough.

There exists a myriad of applications in which this measurement approach is either beneficial or required. These include heating, ventilating and air conditioning systems (HVAC), air handling systems, combustion processes, flows within enclosures and catalytic converters and the motivating problem of determining the velocity and temperature distribution at the downstream face of a motor vehicle radiator.

The present invention is directed to an apparatus and method for flow measurement of one or more regions of a field of fluid flow. While developed and useful for general applications in motor vehicle applications, the influence of various upstream obstructions such as an air conditioning condenser, a transmission oil cooler, variously oriented bracing and crash members, decorative grill work and the like on the flow distribution through the vehicle radiator, is of interest.

BRIEF SUMMARY OF THE INVENTION

A thermal transient anemometer provides mass flow rate or volume flow rate over one or more discrete regions of a flow field, i.e., the distribution of flow rates over a pre-defined, larger area. The thermal transient anemometer comprises two components: a frame, typically including a plurality of sensing cells each having a resistance wire grid, and a control unit which includes an energy source which heats the resistance wire grid of each cell, measurement circuitry for determining the decay of resistance of the grid wires as they cool and computational circuitry which determines the mass or volume flow rate through each cell based upon such decay function.

Thus it is an object of the present invention to provide an apparatus for measuring the mass or volume flow through at least one cell or region of a flow field.

It is a further object of the present invention to provide a method for measuring the mass or volume flow through at least one cell or region of a flow field.

It is a still further object of the present invention to provide an apparatus for measuring the mass volume flow rate of a fluid through a plurality of smaller regions of a larger flow field.

It is a still further object of the present invention to provide a method for measuring the mass volume flow rate of a fluid through a plurality of smaller regions of a larger flow field.

It is a still further object of the present invention to provide a thermal transient anemometer having a plurality of sensing cells each including a resistance wire grid.

It is a still further object of the present invention to provide a thermal transient anemometer for measuring mass or volume flow rate through a plurality of smaller cells of a larger flow field by measuring the change in resistance of a heated wire in each cell as it cools due to flow past the wire.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
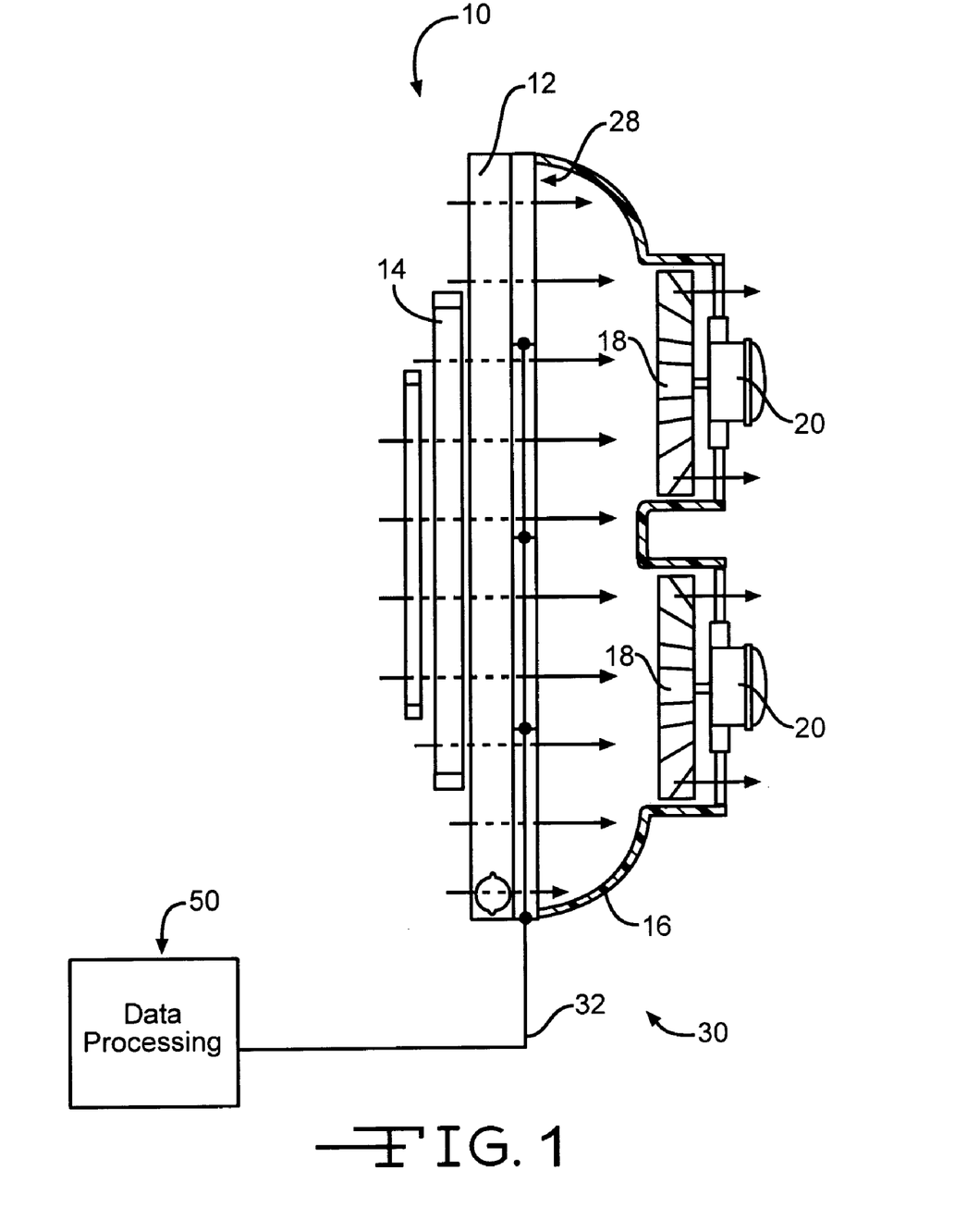
FIG. 1 is a side elevational view of a thermal transient anemometer multiple cell sensing assembly according to the present invention disposed adjacent and behind a motor vehicle radiator.

Referring now to FIG. 1, certain components of a motor vehicle cooling system are illustrated and generally designated by the reference number 10. The motor vehicle cooling system 10 includes a radiator 12 disposed transversely within the vehicle engine compartment. The radiator 12 includes passageways (not illustrated) for engine coolant and a plurality of fins (also not illustrated) which facilitate heat transfer to the air passing therethrough. Disposed on the upwind, i.e. the front, side of the radiator 12 is an air conditioning condenser 14 which is also exposed to the air flow through the radiator 12. Additional cooling devices (not illustrated) such as transmission oil coolers or engine oil coolers may be disposed in the air flow path.

A shroud 16 facilitates airflow from the radiator 12 and the condenser 14. At the rear or trailing portion of the shroud 16 is disposed at least one and preferably a pair of fans 18 which are driven by electric motors 20. In accordance with conventional practice, the electric motors 20 are controlled by a thermostat disposed to sense the temperature of the engine coolant and the electric motors 20 are energized when the temperature of the engine coolant rises to a predetermined level. Alternatively, a single fan (not illustrated) driven through a belt and powered by the vehicle motor (also not illustrated) may be utilized.

On the downwind side or rear face of the radiator 12 is a flow sensing assembly 28, one of the components of a thermal transient anemometer 30. Preferably, the flow sensing assembly 28 defines a height and width equal to or substantially equal to the device or assembly through or across which fluid flow is to be measured. A multiple conductor cable 32 provides electrical energy to the flow sensing assembly 28 and carries data in the form of electrical signals to a control unit or assembly 50.

Figure 2:
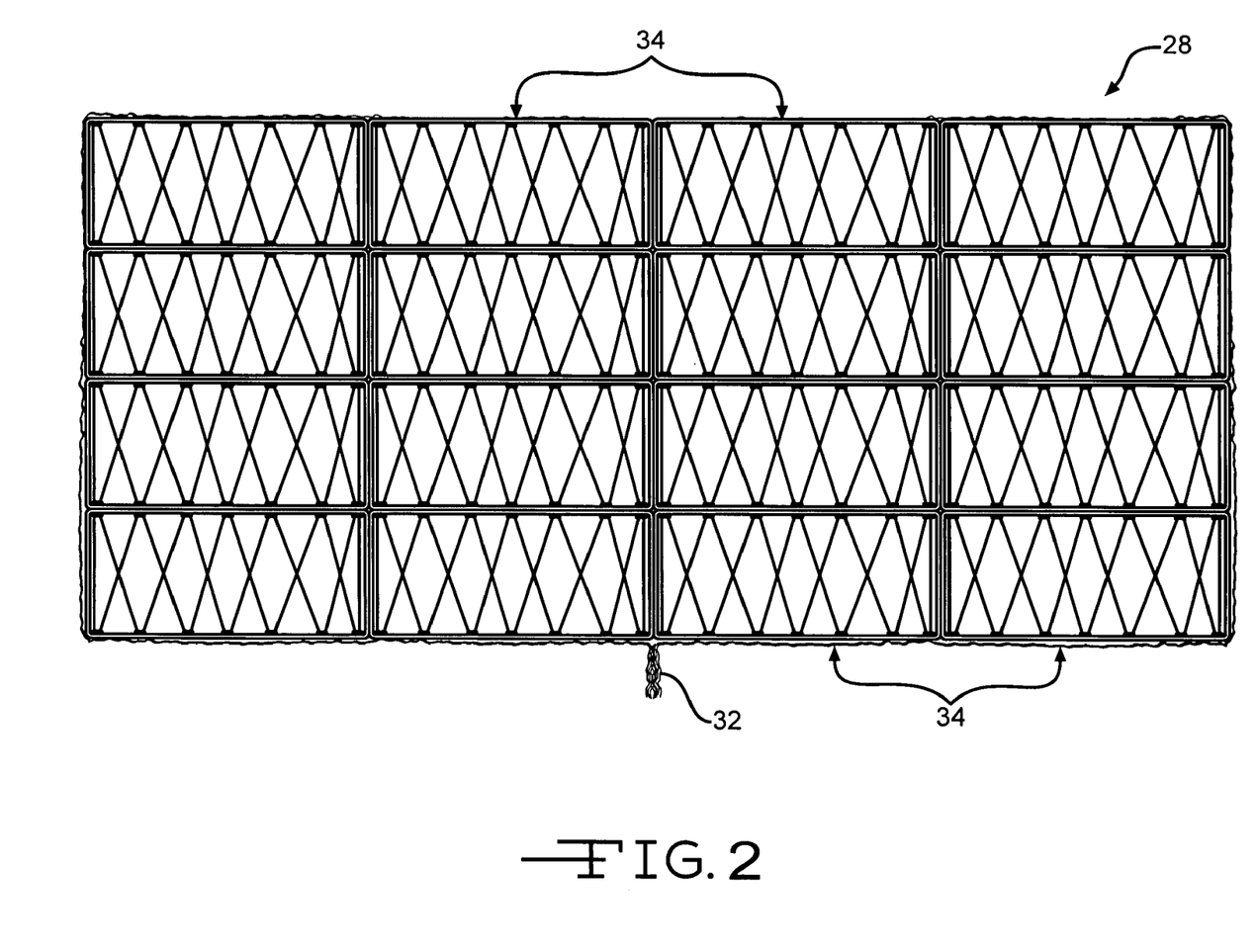
FIG. 2 is an enlarged, front, elevational view of a multiple cell sensing assembly of a thermal transient anemometer according to the present invention.
Figure 3:
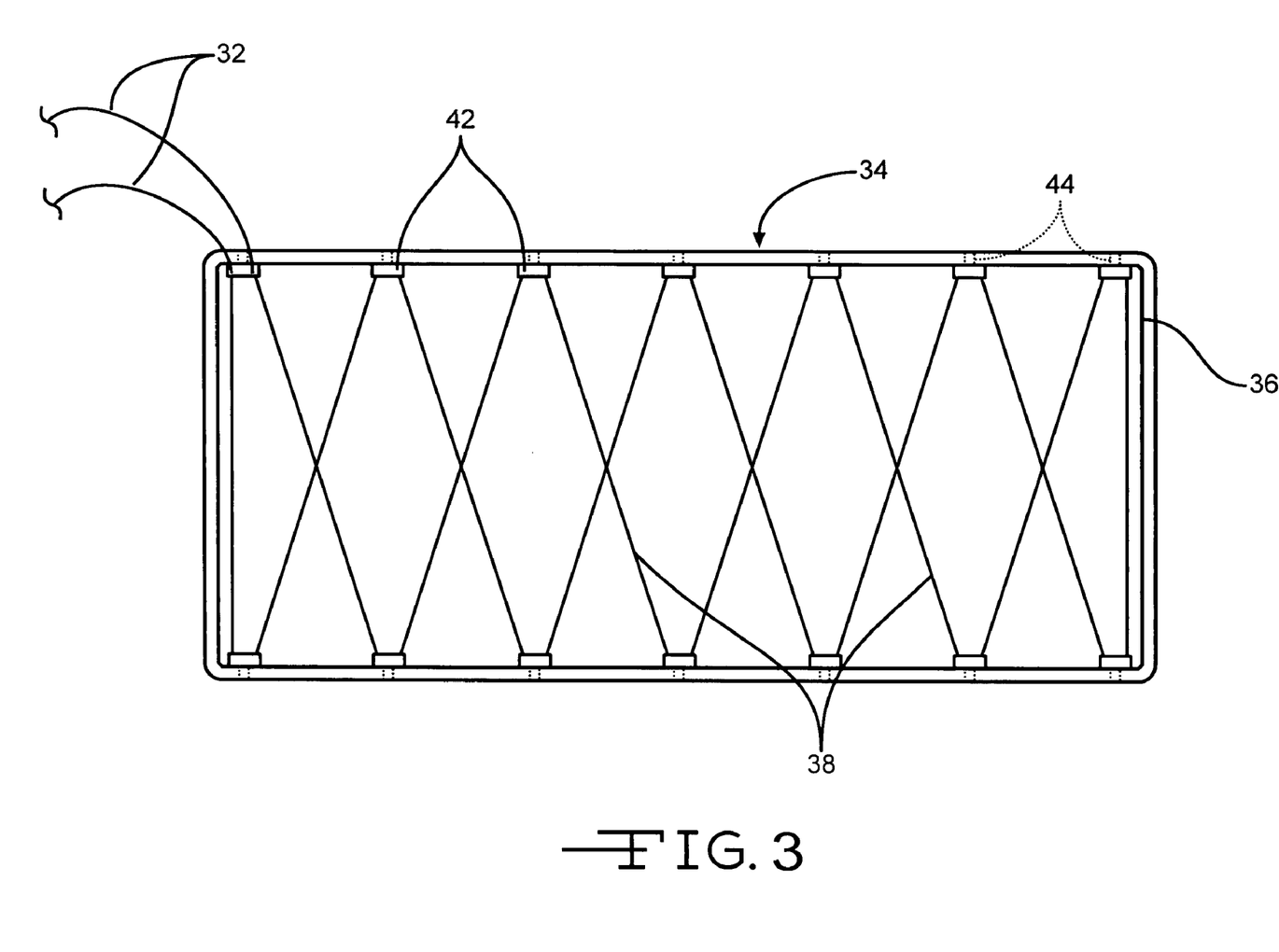
FIG. 3 is an enlarged, front, elevational view of a single cell of a sensing assembly of a thermal transient anemometer according to the present invention.

Referring now to FIGS. 2 and 3, the flow sensing assembly 28 typically comprises a plurality of cells 34 which are arranged and secured together to form the assembly 30. The cells 34 are configured to conform to the object and fluid field to be sensed and may be either identical or have distinct configurations. As noted, the flow sensing assembly 28 defines a height and width equal to or substantially equal to the height and width of a device such as a radiator 12 or other component defining an area of flowing air or fluid to be measured. Preferably, as well, the aspect ratio of each cell 34 is the same as the aspect ratio of the entire sensing assembly 28. When sensing the flow through a device, such as a radiator 12, it has been found that sixteen cells 34 provide suitable, distinct data. If either data on a finer scale is needed or the object and airflow field to be sensed is large, a greater number of cells 34, of course, may be utilized and vice versa.

As illustrated in FIG. 3, each of the cells 34 defines a strong and rigid frame 36 fabricated of, for example, a stainless steel member 36. Stretched across and extending in a diagonal, generally diamond or multiple X-shaped pattern is a tungsten or ni-chrome high temperature resistance wire 38. The resistance wire 38 is stretched between insulating tether plugs 42 which are received and retained within complementarily configured openings 44 in the frame 36. The tether plugs 42 are preferably fabricated of a high temperature thermal and electrical insulating material such as Teflon or ceramic.

Figure 4:
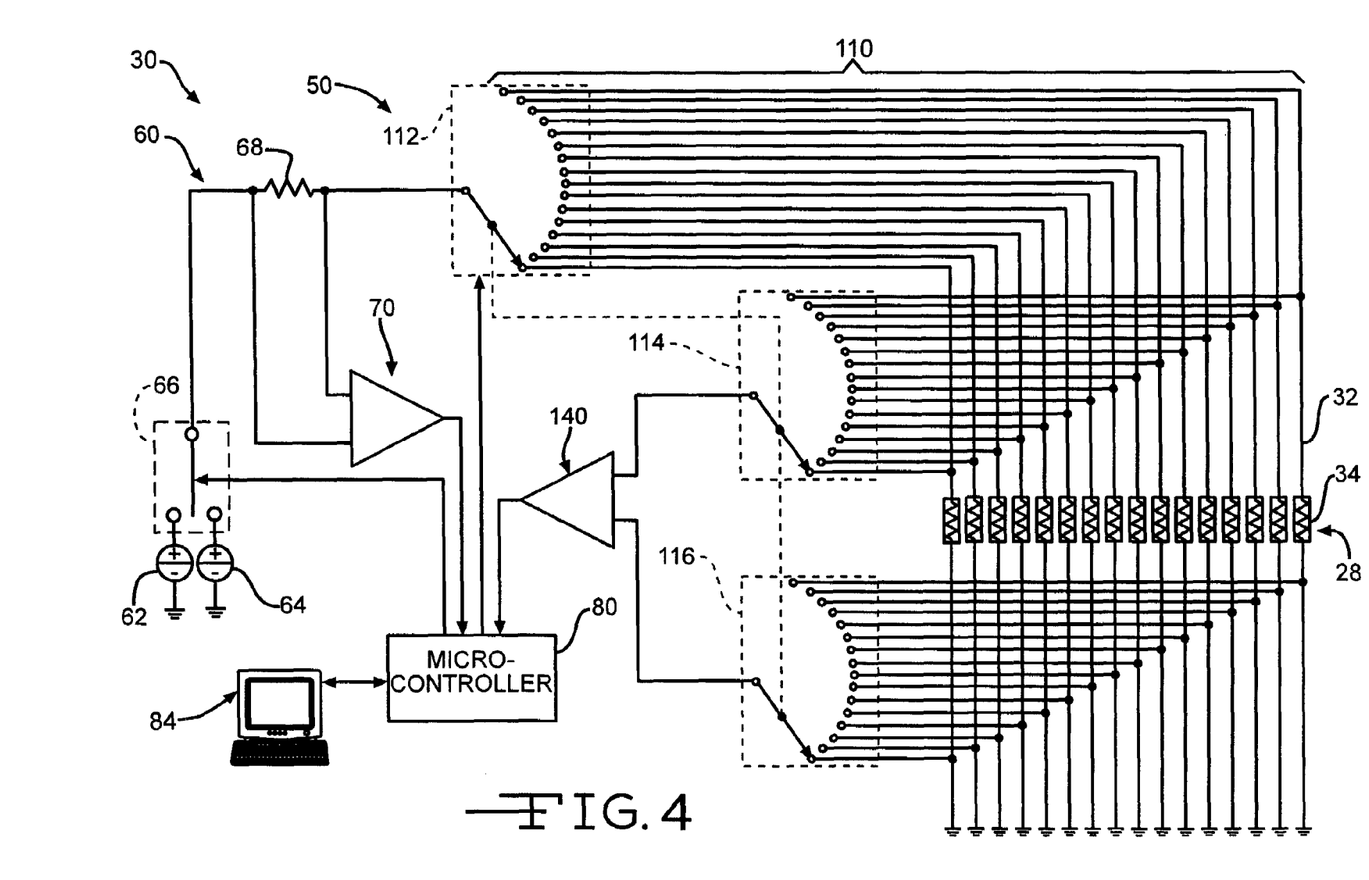
FIG. 4 is a functional diagram of the electrical components of a thermal transient anemometer according to the present invention.

Referring now to FIG. 4, a functional diagram of the operational modules of the control unit 50 is illustrated. At the outset, it should be understood that operation of the thermal transient anemometer 30 and specifically the control unit 50 proceeds in sequence: the average ambient temperature is measured by providing a low level current to a first cell 34, greater electrical current then provided to the same cell 34, the resistance wire 38 heats to a desired temperature, heating electrical current is then discontinued and the lower level electrical current is again provided to the resistance wire 38 to facilitate measurement of the resistance of the wire 38 and thus the decaying temperature caused by fluid flow thereover. This sequence of events is then repeated with a second cell 34, a third cell 34 and a fourth cell 34 until each resistance wire 38 of each cell 34 has first measured the ambient temperature, has been heated and its (decaying) resistance measured. Then, the heating and measurement process may be repeated.

To achieve this operation, the control assembly 50 includes a power module or assembly 60 having a first source 62 of electrical energy of sufficient voltage and current to individually and sequentially heat the resistance wire 38 of each cell 34 to several hundred degrees Kelvin, preferably on the order of 400 degrees Kelvin, but below the oxidation temperature of the particular resistance wire 38 selected. A second (current) source 64 of electrical energy of lower voltage and current is also provided which facilitates monitoring of the resistance of the resistance wire 38 as it cools and to achieve the ambient temperature reading. The current source 64 provides a constant current of approximately 10 milliamps which places a voltage of approximately 10 millivolts per ohm across the resistance wires 38. The voltages from the first (voltage) source 62 and the second (current) source 64 are provided to a selector device 66 which is preferably an electronic switch. The output of the selector device 66 passes through a fixed precision resistor 68.

The voltage drop through the fixed precision resistor 68 is provided to an overheat sensing assembly or module 70 which drives one input of a digital signal processor, microprocessor or microcontroller 80. The microcontroller 80 controls the overall operation of the thermal transient anemometer 30. The microcontroller 80 coordinates operations, providing commands which sequentially select, heat and sense the temperature decay of individual resistance wires 38 and communicate commands and data to and from a personal computer 84.

The fixed precision resistor 68 and the overheat sensing assembly or module 70 provide a signal to the digital signal processor 80 indicating that sufficient Joule heating has occurred and that the correct overheat condition exists in the resistance wire 38 of each of the cells 34. Electrical energy selected and provided by the power module or assembly 60 is then provided to a cell selector assembly or module 110. The cell selector assembly 110 includes a first, a second and a third, preferably electronic, selector switch 112, 114 and 116, respectively, having a plurality of outputs equal in number to the number of cells 34 in the sensing assembly 28. The positions of the three selector switches 112, 114 and 116 and thus the selection and connection to a particular cell 34 is under the control of the microcontroller 80.

Preferably, the three selector switches 112, 114 and 116 are ganged together as they preferably all function and select a given cell 34 simultaneously. As noted, the first selector switch 112 has a plurality of positions and outputs equal in number to the number of cells 34 in the assembly 28. The second selector switch 114 connects to one end of the resistance wire 38 in each of the cells 34 and the third selector switch 116 connects to the other end such that the output of the second and third selector switches 114 and 116 provide and permit sensing of the resistance of the individual resistance wires 38 of each of the cells 34. This information is then provided to an amplifier module or assembly 140 which provides its output to the microcontroller 80. An output of the microcontroller 80 is provided through an RS-232 link or transceiver 82 to a personal computer 84, which may also include a storage device, printer or other peripheral component (all not illustrated) for control, display and storage of the data measured and collected by the thermal transient anemometer 30.

Figure 5:
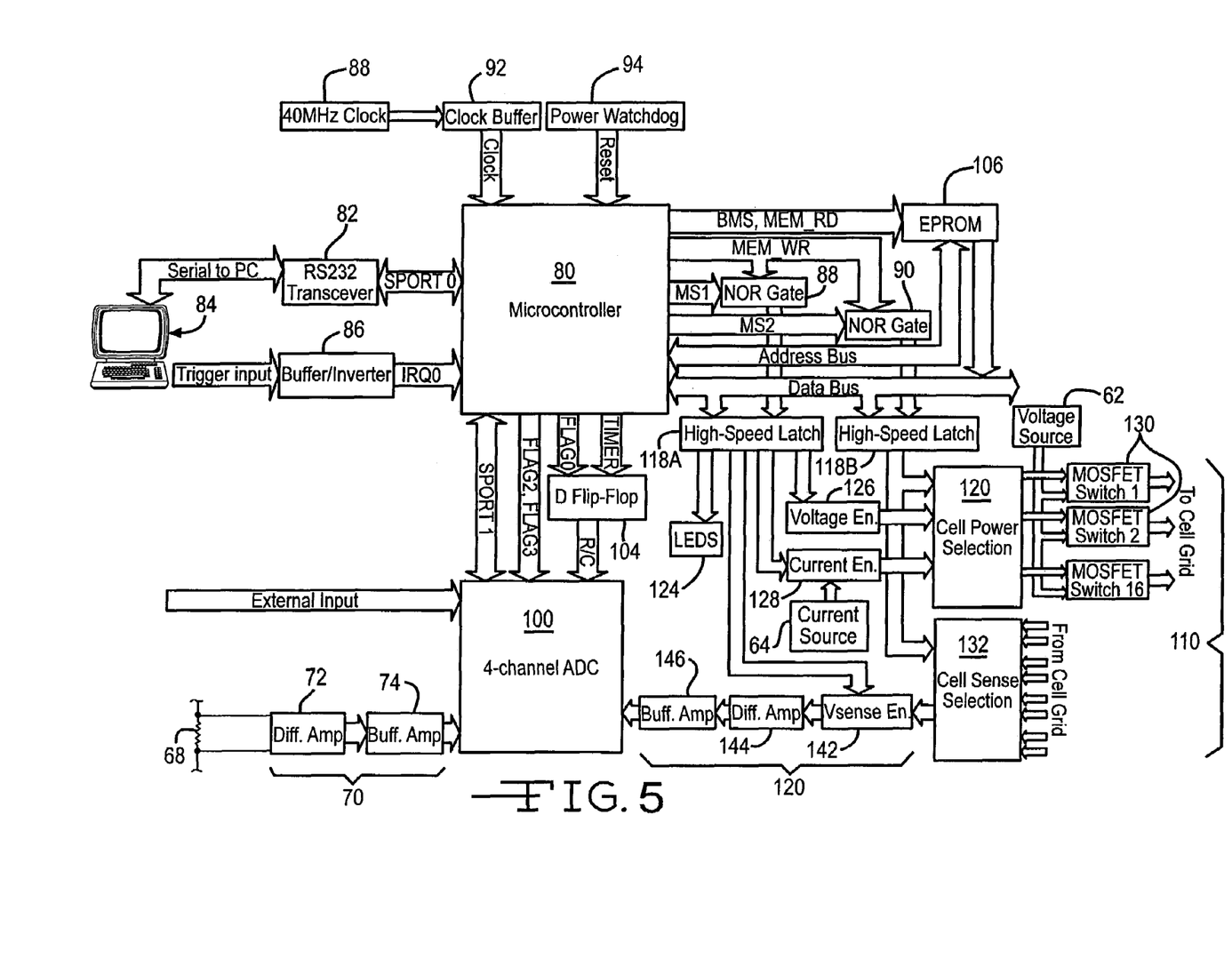
FIG. 5 is a block diagram of the electronic components of a thermal transient anemometer according to the present invention.

Referring now to FIG. 5, the electronic components of the control assembly 50 include the RS-232 transceiver 82 which buffers the serial receive and transmit data from −7 volts to +7 volts from the computer 84 to 5 volts to 0 volts CMOS logic on the side of the microcontroller 80. The control assembly 50 also includes a 40 megahertz clock 88 which is a crystal oscillator providing a 40 megahertz time base and a 3.3 volt TTL output having a 5 nanosecond maximum rise and fall time. The output of the 40 megahertz clock 88 is provided to a clock buffer 92 which converts the 3.3 volt TTL output of the clock 88 to a 5 volt CMOS output required and utilized by the digital signal or microcontroller processor 80. Also associated with the microcontroller 80 is a power watchdog or supervisor 94 which holds the microcontroller 80 in reset until 20 milliseconds after the power supply has reached 4.65 volts to prevent the microcontroller 80 from booting until the power supply is stabilized.

The control assembly 50 also includes three buffer inverters 86, 88 and 90 which include four input NOR gates. The first buffer inverter 86 is used as an inverting buffer for the external trigger provided by the personal computer 84. The second and third buffer inverters 88 and 90 are used to direct the MEM_WR signal from the microcontroller 80 based on the MS (memory select) flags to a pair of high speed data latches so that one will latch only when MS1 is asserted and the other will latch only when MS2 is asserted.

The fixed precision resistor 68 is a two milliohm precision resistor which is disposed in series with the output of the selector device 66. By measuring the voltage drop across the precision resistor 68, the current flow into a selected resistance wire 38 can be determined. Furthermore, since the applied voltage is known, determination of the current then permits determination of the resistance of the resistance wire 38 as it heats. The value of the precision resistor 68 must be small in order to avoid affecting the overheat of the resistance wire 38. Hence, the voltage drop across the precision resistor 68, though proportional to the current flow through the resistance wire 38, is also small. A differential amplifier 72 and a buffer amplifier 74 are utilized to amplify the voltage drop across the precision resistor 68 of approximately 0 to 55 millivolts to approximately 0 to 4 volts which is provided to a four channel analog to digital converter 100.

The four channel, 16 bit analog to digital converter 100 has a sampling rate of 200,000 samples per second with serial interface. Each input of the analog to digital converter 100 can be configured to be a 0 to 4 volt, 0 to 5 volt or −10 volt to +10 volt input. The inputs for current and voltage sense are configured to be 0 to 4 volts while the input for the external voltage monitor is configured to be −10 volts to +10 volts. Flag2 and Flag3 signals 102 determine which input of the analog to digital converter 100 is read. A D flip flop 104 buffers signals from the microcontroller 80 to reset the input of the analog to digital converter 100 allowing the microcontroller 80 to cancel the analog to digital conversion after a predetermined time. An EPROM 106 contains the programming loaded into the microcontroller 80 upon boot.

A pair of high speed latches 118A and 118B receive the 48 data bits from the microcontroller 80 and control the MOSFET driver 120 for cell power selection, and a bank of low resistance isolating optical relays 132. The second high speed latch 118B also receives the 48 data bits from the microcontroller 80 and drives such components as light emitting diode (LED) readout display 124, a MOSFET voltage enable driver 126 and a low resistance current enabling optical relay 128. The configuration of the twin high speed latches 118A and 118B is necessary because there are more than 48 total elements to control and only 48 outputs from the microcontroller 80. Operation of the high speed latches 118A and 118B is controlled by MS1 and MS2 signals combined with the MEM_WR signal from the microcontroller 80.

The LED display 124 may be mounted to the housing (not illustrated) of the thermal transient anemometer 30 and may sequentially indicate, for example, the resistance wire 38 being heated and sensed and thus the flow being measured through a particular cell 34. The MOSFET drivers 120 and 126 boost the 5 volt latched output from the microcontroller 80 to approximately 45 volts in order to drive a plurality of MOSFET switches 130. The MOSFET drivers 120 also control which cell and resistance wire 38 receives the heating voltage while the MOSFET driver 126 disables or inhibits the heating voltage while the 10 milliamp resistance current to the resistance wire 38 is enabled. The plurality of MOSFET switches 130 are solid state power MOSFETs which direct the heating voltage of approximately 30 volts from the heating voltage source 62 and the MOSFET driver 126 to the proper resistance wire 38 and cell 34 based upon the latched data from the microcontroller 80.

The low resistance isolating optical relays 132 transmit the 10 milliamp sensing signal and select the resistance wire 38 for resistance measurement when the 10 milliamp sensed current is applied to the isolating optical relays 132. The isolating optical relays 132 also open to isolate the amplifier assembly 140 when the 30 volt heating voltage is applied to the resistance wires 38.

When measuring the resistance of the resistance wires 38, the thermal transient anemometer 30 functions as a four wire ohmmeter. The amplifier module or assembly 140 includes an electronic switch 142 which enables (transmits) or disables (terminates) transmission of the sensed resistance signal to a differential op amp 144 and a buffer op amp 146 which provide an overall gain of approximately 20 for sensing the resistance of a selected resistance wire 38. The input signal to the differential op amp 144 is limited to approximately 0 to 75 millivolts and must be amplified to a 0 to 4 volt range for the analog to digital converter 100. The differential op amp 144 provides a gain of approximately 10 while the buffer op amp 146 provides a gain of approximately 2.

Operation

The measurement objective of the thermal transient anemometer 30 is to determine the mass flow rate ($\dot{m}$) or the volume flow rate (q) through a designated area. This area is understood to be larger than a point and smaller than the complete cross section of the conduit or the domain of the flow. Formally, these quantities can be expressed as $$\dot{m} = \int_A \rho \vec{V} \cdot \hat{n} dA \text{ and } \dot{m} = \int \vec{V} \cdot \hat{n} dA \tag{1a}$$

The present technique is applicable to the flow situations for which $\vec{v} \cdot \hat{n} = |\vec{V}|$; that is, for the flow conditions in which the velocity is perpendicular to the area of interest. The symbols <pU> and <U> are introduced as $$\langle pU \rangle \equiv \frac{1}{A} \int \rho \vec{V} \cdot \hat{n} dA, \langle U \rangle \equiv \frac{1}{A} \int \rho \vec{V} \cdot \hat{n} dA \tag{1b}$$

to indicate the measured quantifies of the thermal transient anemometer 30. In order to permit one electronic control unit 50 to serve a wide range of cell sizes, the resistance of the resistance wires 38 is maintained at a nominally constant value by adjusting the square of the wire diameter ($D_s^2$) as the length (L) of the resistance wire is changed to accommodate larger/smaller sizes of the cells 34. Namely ($L/D_s^2$) is maintained as a nominally constant value.

The electronic circuit of FIG. 5 delivers electrical current to the resistance wire 38 of a thermal transient anemometer cell 34 until a preset level ($R_{hot}$) of resistance is reached. Namely, $$R(T) = R_{amb}(1 + OHR) = \alpha T_{amb}(1 + OHR) \quad (2)$$

where $\alpha$ is the temperature coefficient of resistance of the resistance wire 38. ($T_H$ is established to be less than the oxidation temperature). The control unit 50 then transitions from heating to sensing in which a small (10 ma) current is used to record the resistance of the resistance wire 38 as a function of time.

Each segment ($\Delta x$) of the tungsten or ni-chrome resistance wire 38 will lose energy by convection to the passing air and either gain or lose energy by conduction along its length. These effects have been modeled by numerous authors. The analytical description by Morris and Foss (2003) provides a useful reference for the present considerations. Namely, the resistance wire 38, between the supported ends, can be subdivided into short length segments: $\Delta x$, and each element can be described by the thermal balance equation:

$$\left\{ (\Delta x) p_x c A_s \frac{\partial T}{\partial t} = q_{axial} - q_{convection} + I^2 R \right\}_n \quad (3)$$

where $I^2 R_n$ is the power released in the nth $\Delta x$, $$q_{axial}]_n = -(\Delta x) K_s A_s \left. \frac{\partial^2 t}{\partial X^2} \right]_N \quad (4)$$

and $$q_{conv}]_n = h_n \pi D_s \Delta X [T_n - T_{amb}] \quad (5)$$

The subscript "s" refers to the resistance wire 38. The convection coefficient: $h_n$, can be modeled in terms of the Nusselt number, Reynolds number, Prandtl number expression:

$$Nu = 0.42 Pr_f^{0.26} + 0.57 Pr_f^{0.33} Re_f^{0.45} \quad (6)$$

from Brunn (1995). (Note that $hD_s/k \equiv Nu$ and $[pUD_s/\mu] \equiv Re$ where $D_s$ is the diameter of the resistance wire 38). The $[\ ]_f$ terms signify a "film temperature" for the evaluation of the thermodynamic properties $$\left( T_f = \frac{T_n + T_{amb}}{2} \right).$$

The initial temperature distribution: T(x) for t<0 would derive from (3) with the steady state heating condition ($\partial T/\partial t = 0$) and with the boundary conditions that $T_{sensor} = T_{support}$ where the resistance wires 38 are supported at their "tether points." The full equation (3) would then be used to describe the "temperature decay" following the cessation of the heating current (I=0).

The measured resistance $R_s$ of the wire 38, can be described as the summation of the resistance values for each segment "n," of the resistance wire 38. From equation (2), and using the ambient condition as the reference for the linear variations of R with respect to T, $$R_n = \{\alpha(T_n - T_{amb}) + R_{amb}\} \quad (7)$$

and $$R_s = \sum_{n=1}^{N} R_n \quad (8)$$

for the N individual segments of the sensor.

If the convection effects in (3) dominate the conduction effects and if this condition holds on average for all $\Delta x$ elements, and if the convection coefficient h (from equation (6)) were constant, then the simplified equation:

$$\frac{d}{dt} T_s = (-1/\tau)[T_s - T_{amb}], \quad (9)$$

where $T_s$ is the average wire temperature, would lead to the exponential decay of the wire temperature as $$T*(t) = \left[ \frac{T_s(t) - T_s(\infty)}{T_H - T_{amb}(\infty)} \right] = \exp(-t/\tau). \quad (10)$$

The time constant: $\tau$, represents the constants of the problem including the reciprocal of h from equation (5). The utility of equation (10) is that it represents, with reasonable accuracy, the experimental data as shown below. The simplified response given by equation (10) is termed the "first order response" equation.

Second order effects are present in the temperature dependence of h as identified in equation (6). These effects can be analytically considered as described below. Additionally, it is useful to establish an upper bound for $T_H$ that will be certain to avoid oxidation of the resistance wire 38. The $T_H$ value, in the following, will be set at 510° K. The initial film temperature depends, therefore, on $T_{amb}$. This (510° K) temperature setting is a conservative estimate for the oxidation temperature. Blackwelder, for example, quotes 300° C. as the oxidation temperature. In practice, 510° K is sufficient to obtain a well defined T(t) distribution for the evaluation of $\tau = \tau(<U>)$. Higher temperatures ($T_H$) could be utilized if large $T_{amb}$ values were encountered.

The relevant h values are obtained from (6) with the condition that $<p_{amb}U>$ is factored out from the Re term as $$h = \frac{k_f}{D_s} \left\{ [0.42 Pr_f]^{0.26} + 0.57 P_{f_f}^{0.33} \left\{ \frac{P_f/P_{amb}}{\mu_f} \right\} [P_{amb} U]^{0.45} \right\}. \quad (11)$$

A simplified statement of (11) is $$h \approx D_s \frac{k_f}{\ } \left\{ (0.57 Pr]_f^{0.33} \left\{ \frac{1}{v_f P_{amb}} \right\}^{0.45} \langle P_{amb} U \rangle^{0.45} \right\}.$$

If the h(T) values were sufficiently constant, as computed from (12) for the range of T values to be experienced in the thermal transient anemometer 30 operation, then the first order response as described by (10) could be used without considering second order effects. Test conditions of $U=1, 5, 10$ mps $T_{amb}=300, 400°$ C.

have been selected to evaluate the variation in h during the temperature decrease from $T_H$ to $T_{amb}$. For the conditions considered, U=1 m/sec and $T_{amb}=400°$ K provide the largest disagreement between equations (11) and (12); specifically, h from (11) is 0.7% larger than h from equation (12). This is considered to be sufficiently small such that (12) will be used to infer $<p_{amb}U>$ when $T_{amb}(cal) \neq T_{amb}(test)$. $T_{amb}$ (test) will simply be identified as $T_{amb}$ in the following.

Figure 6:
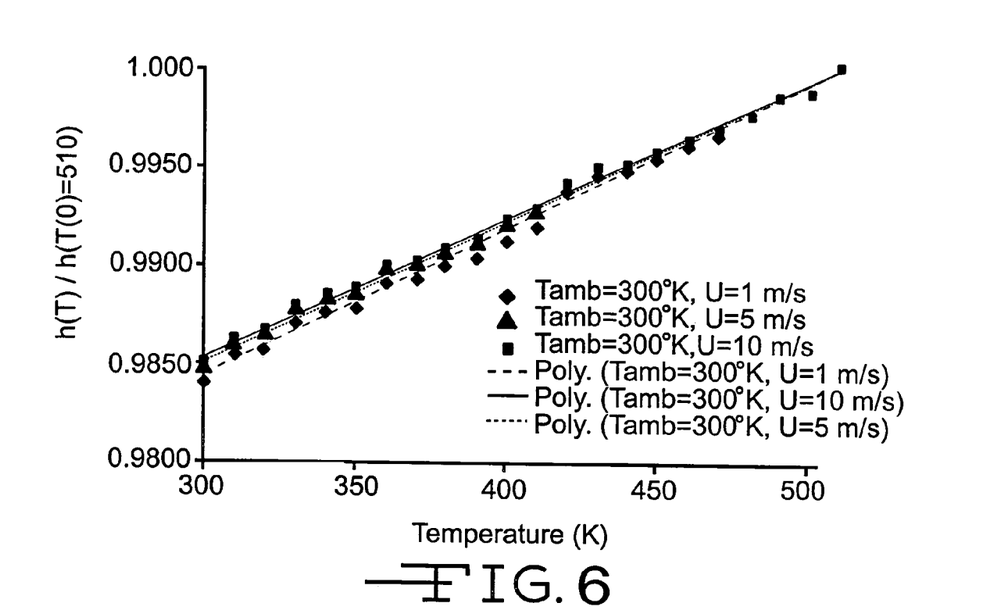
FIG. 6 is a normalized heat transfer coefficient at an ambient temperature of 300° Kelvin illustrating operation of the thermal transient anemometer according to the present invention.
Figure 7:
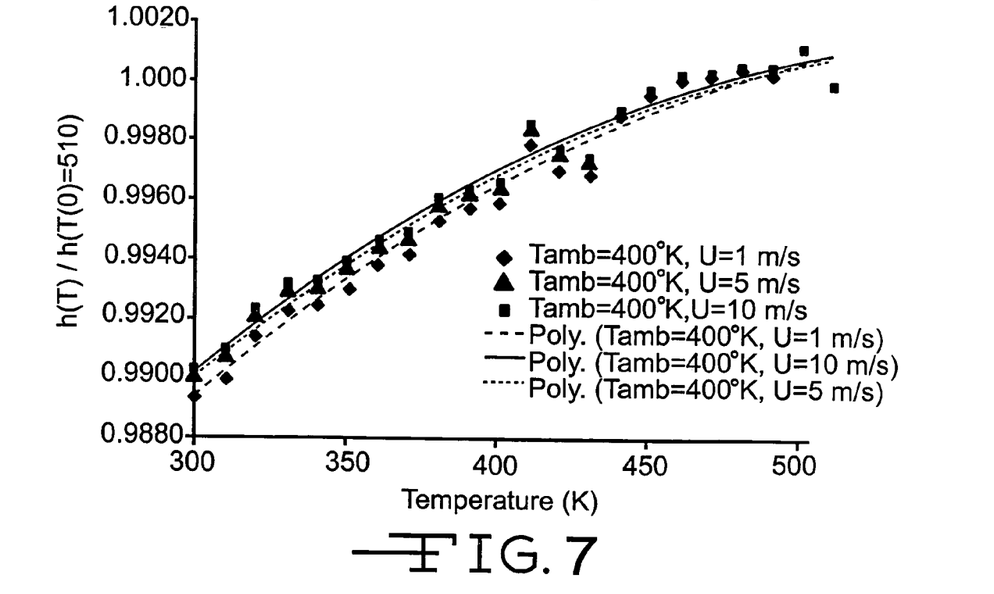
FIG. 7 is a normalized heat transfer coefficient at an ambient temperature of 400° Kelvin illustrating operation of the thermal transient anemometer according to the present invention.

The property values, to evaluate the terms in equation (12), were obtained from Table C.1 of Johnson (1998). The computed $[h(T)/h(T_H)]$ values are presented in FIG. 6 for $T_{amb}=300°$ K and FIG. 7 for $T_{amb}=400°$ K. The somewhat irregular $h(U, t_{amb})$ values are ascribed to round-off effects in the tabulated values and the small range $[0.985 \leq h(T)/h(T_H) \leq 1]$ of the values shown in FIGS. 6 and 7. Consider that a 1% variation in h(T) is acceptable for the use of the first order response (i.e., the simple exponential variation of T(t) in (10)). For $T_{amb}=300°$ K, $h(360)/h(510)=0.99$. If $T_{amb}=400°$ K, $\delta h/h(T_H)$ is 0.3%. Hence, the operational condition that the data will be utilized in the range: $510°$ K $\rightarrow 360°$ K for $T_{amb} \geq 300°$ K, is established for the subsequent processing.

Equation 3 with the supporting equations 4, 5, 6 and the protocol of beginning the transient solution with the cessation of the heating current can be termed "an initial and boundary value problem." It has been noted that the temperature of the resistance wire 38 will be that of the tether plug 42 at this boundary of the cell 34. The energy delivered to the tether plug 42 and the subsequent conduction-convection from it will determine this temperature.

In lieu of an attempt to analytically solve the complete initial and boundary value problem, one can impose a uniform approach velocity and record $R_s(t)$ in order to provide an empirical solution to the "completely accurate governing equation with its initial and boundary conditions." The thermal transient anemometer 30 of FIG. 3 was used for this purpose. Using representative experimental data, a "fitting template" has been created that operates in the temperature range: 360–510° K, for the sensor. Experience shows that the convection term is dominant and the signal-to-noise levels are relatively large for this temperature range. (The relatively large signal-to-noise ratio permits an accurate assessment of the T(t) relationship which, in turn, permits an accurate evaluation of the time constant ($\tau$)). Also, the large value of "resistance wire length to resistance wire diameter"—here nominally equal to 2000 for the reported measurements—is also responsible for the dominance of the convection term, rhs of equation (3). These features are demonstrated in the next section.

As illustrated in FIG. 3, a single thermal transient anemometer 30 cell 34 was fabricated using a stainless steel frame 36 and Teflon tether plugs 42. This cell 34 was mounted in a subatmosphere chamber at the exit plane of a delivery conduit from a low disturbance plenum. A calibrated Venturi meter was used to determine the flow from this chamber and the known density (p) and inflow area (A) allowed the spatially averaged velocity at the cell 34 to be known in terms of the measured $\dot{m}$(mass flux) value as:

$$<U>=\dot{m}/pA \quad (13)$$

The response of the cell 34, operating as a thermal transient anemometer 30 was determined for nine $<U>$ values that are typical of the velocities to be expected in an automotive cooling circuit. Three of these velocities were selected to demonstrate the features of the thermal transient anemometer 30.

Equation (7) allows the temperature ratio of equation (10) to be written as the time varying sensor resistance values in non-dimensional form; namely $$R^* = \left[\frac{R_s(t) - R_{amb}}{R_s(T_H) - R_{amb}}\right]. \quad (14)$$

Figure 8:
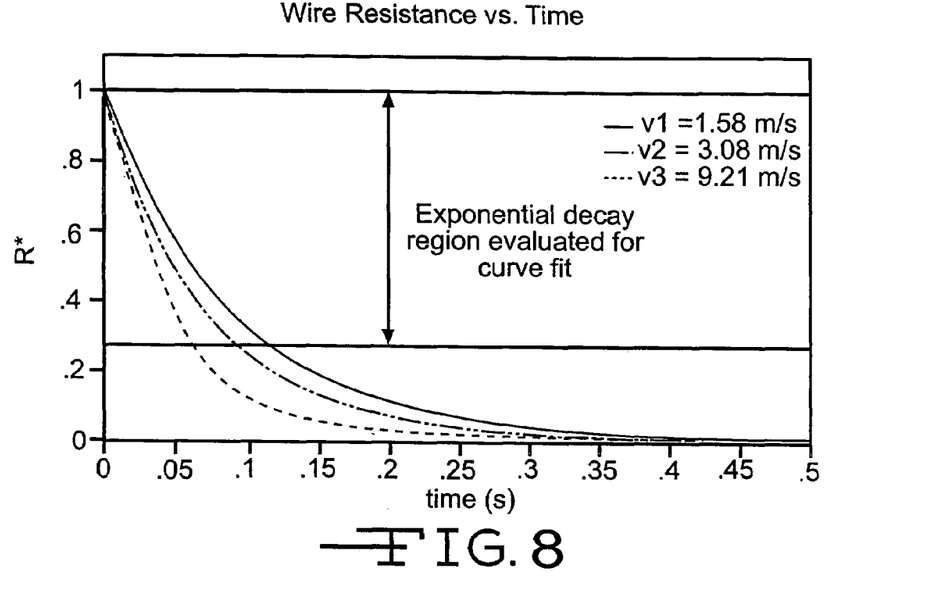
FIG. 8 illustrates the real time decay of the resistance of a resistance wire of a cell versus time in a thermal transient anemometer according to the present invention.

Three representative velocities: 1.58, 2.08, 9.21 m/sec, provide the R*(t) values presented in FIG. 8.

The data of FIG. 8 were utilized in the range $1 \leq R^* \leq 0.286$ given the ambient temperature of 21° C. and the limit of 1% variation in h described above.

Figure 9:
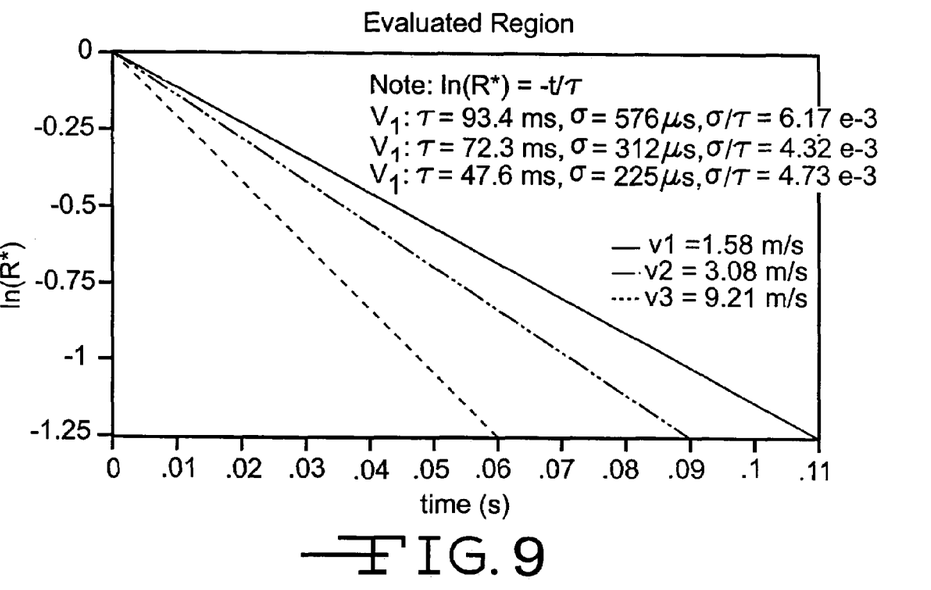
FIG. 9 illustrates the logarithmic time decay of the resistance of a resistance wire of a cell versus time in a thermal transient anemometer according to the present invention.

Excellent agreement with an exponential decay is evident in the data representation of FIG. 9. The best fit (least squares) relationship yields the indicated $\tau$ values for the expressions $$lnR^* = -t/\tau(<U>) \quad (15)$$

Figure 10:
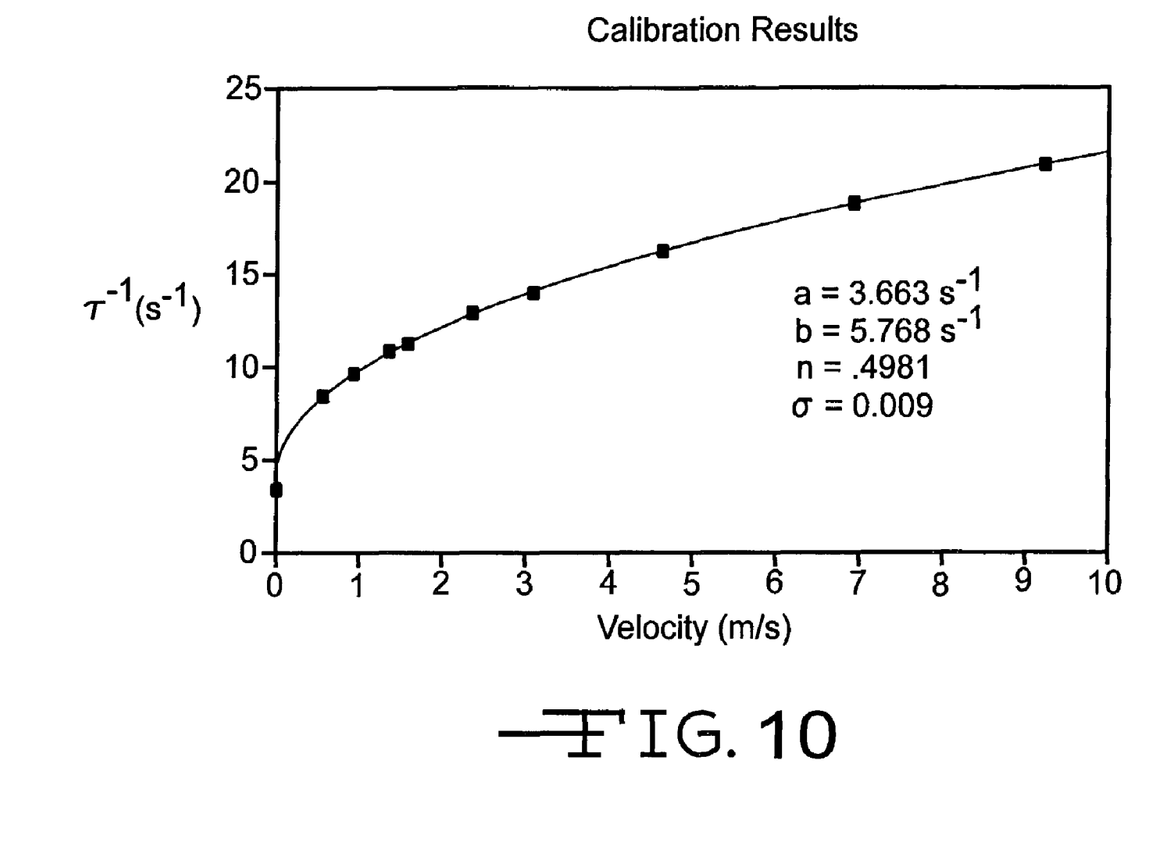
FIG. 10 is a representative illustration of calibration data that support the analytic expression $1/\tau = A + B<U>)_n$ in a thermal transient anemometer according to the present invention.

The complete set of experimental data can be evaluated in terms of the expected functional form:

$$\frac{1}{\tau} = A' + B'\langle U \rangle^n \quad (16a)$$

where the left-hand side of (16a) is of the form expected for the solution to (3) with negligible end conduction to the tether plugs 42, $I^2R=0$ and h=constant. The agreement demonstrated between (13) and the data for the discrete velocity values (see FIG. 10), gives confidence that a calibrated thermal transient anemometer 30 can provide an accurate $\tau \rightarrow <U>$ transfer function in its calibrated range. Specifically, the standard deviation between the fitted relationship (13) and the experimental data is 0.008 m/sec.

Consider that the basic response of the thermal transient anemometer 30 is established via calibration and the A, B, n coefficients are established at the ambient temperature: $T_{amb}$, the basic heat transfer relationships of equations (3), (5), (12), that rely on the value of h, can be utilized to determine the $<pU>$ product experienced by the resistance wire 38.

From equations (3), (5) and (12), it is apparent that the direct effect of $T_{amb} \neq T_{amb-cal}$ is included in the $[T(t)-T_{amb}]$ term that represents the "driving" effect for the heat transfer. The indirect effects on h are represented by the temperature dependencies of the Nusselt Number which, as described in Section 2.2, vary by less than 1% for $T_{amb})test > T_{amb})_{cal}$ when T=360° K is used as the lower bound for the evaluation of $\tau$ and $T_{amb})_{cal} \geq 300°$ K. Hence, as shown by equation (12), the measured $\tau$ value can be used to infer the $<pU>$ product and (16a) can be rewritten as $$\frac{1}{\tau} = A'' + B''\langle pU \rangle^n \quad (16b)$$

It is instructive to observe that this product: $<pU>$, is of primary interest given the presence of an elevated $T_{amb}$ as would be experienced in the automotive application with a firing engine and heat transfer from the radiator 12. Specifically, if the local velocity and density magnitudes vary over the sampled area, then their spatial variations can be described as $$U = <U> + U' \quad (17a)$$

and $$\rho = <\rho> + \rho' \quad (17b)$$

With ( )' as the deviation from the spatial average. The true mass flux will be described as (for the cell area: $A_c$)

$$A_c <\rho U> = A_c \{<\rho><U> + <\rho'U'>\} \quad (18)$$

the separate $<\rho>$ value can be obtained from the barometric pressure: $\rho(abs)$, and $<T>$ as obtained from $T_{amb}$ in the measurement process. This will allow $<U>$ to be determined under the assumption that $<\rho'U'>=0$. However, an estimate of the true mass flux is available from the measured $<\rho U>$ product as shown in equation (16b). While the foregoing description relates to a flow sensing assembly 28 of a thermal transient anemometer 30 having a plurality, e.g., 16, cells 34, the invention may be practiced with but a single cell 34 or, for example 2, 4, 8, 10, 12, or more cells 34 including an odd number of cells, if desired.

The foregoing disclosure is the best mode devised by the inventor for practicing this invention. It is apparent, however, that devices incorporating modifications and variations will be obvious to one skilled in the art of an apparatus for measuring the flow rate of a fluid through smaller regions of a large flow field. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A thermal anemometer for measuring an individual area flow in a flow field, comprising, in combination,
   a sensing assembly defining a plurality of measurement cells, said plurality of cells having a resistance wire grid, and
   a control assembly including:
      a power supply for alternately providing heating power and sensing power to said resistance wire grids of said plurality of cells, and
      means for measuring resistance of said resistance wire grids and providing an output corresponding to a fluid flow through each of said measurement cells.

2. The thermal anemometer of claim 1 wherein an aspect ratio of said measurement cells is the same as an aspect ratio of said sensing assembly.

3. The thermal anemometer of claim 1 wherein said control assembly further includes switching means for alternately connecting said heating power supply and said measuring means to said measurement cell.

4. The thermal anemometer of claim 1 further including a personal computer for providing commands to and receiving data from said control assembly.

5. The thermal anemometer of claim 1 wherein said sensing assembly is disposed in fluid flowing through a vehicle radiator.

6. The thermal anemometer of claim 1 wherein said control assembly includes means for detecting an overheat condition in said resistance wire grid.

7. The thermal anemometer of claim 1 wherein said resistance wire grids are fabricated of a metal selected from the group of tungsten or ni-chrome.

8. A thermal anemometer for measuring fluid flow in a fluid flow field, comprising, in combination,
   a sensing assembly having at least one measurement cell, said cell having a resistance wire, and
   a control assembly including:
      a first power supply for intermittently providing hearing power to said resistance wire of said cell,
      a second power supply intermittently providing sensing power to said resistance wire of said cell, and
      means for measuring the resistance of said resistance wire of said cell when sensing power is being supplied to said resistance wire and providing an output representing a flow of fluid through said cell.

9. The thermal anemometer of claim 8 wherein said control assembly includes a microcontroller and an analog to digital converter.

10. The thermal anemometer of claim 9 further including a personal computer for providing commands to and receiving data from said control assembly.

11. The thermal anemometer of claim 8 further including means for alternately connecting said first and said second power supplies to said resistance wire of said measurement cell of said sensing assembly.

12. The thermal anemometer of claim 8 wherein an aspect ratio of said measurement cell is the same as an aspect ratio of said sensing assembly.

13. The thermal anemometer of claim 8 wherein said sensing assembly is disposed in fluid flowing through a vehicle radiator.

14. The thermal anemometer of claim 8 wherein said control assembly includes means for detecting an overheat condition in said resistance wire grid.

15. The thermal anemometer of claim 8 wherein said control assembly includes a light emitting diode readout.

16. A method of measuring air flow across a plurality of regions of a flow field, comprising the steps of:
   providing a measurement assembly having a plurality of cells including a resistance wire,
   measuring a resistance of said resistance wire to determine an ambient temperature,
   heating said resistance wire to a temperature below an oxidation temperature of said resistance wire,
   measuring a decay of resistance of said resistance wire as said wire is exposed to fluid flow, and
   sequentially undertaking the foregoing steps in each of said plurality of cells of said measurement assembly.

17. The method of claim 16 wherein said resistance wire is heated by application of a first electric current.

18. The method of claim 17 wherein resistance of said resistance wire is measured by application of a second electric current smaller than said first electric current.

19. The method of claim 16 further including the step of determining whether electrical current provided to said resistance wire will result in overheating of said resistance wire.

20. The method of claim 16 further including providing a personal computer to store data from each of said plurality of cells of said measurement assembly.

* * * * *

UNITED STATES PATENT AND TRADEMARK OFFICE
CERTIFICATE OF CORRECTION

| | |
|---|---|
| PATENT NO. | : 7,051,599 B2 |
| APPLICATION NO. | : 10/978629 |
| DATED | : May 30, 2006 |
| INVENTOR(S) | : John F. Foss |

It is certified that error appears in the above-identified patent and that said Letters Patent is hereby corrected as shown below:

Column 12, lines 6-7, after "intermittently providing" delete "hearing" and substitute --heating-- in its place.

Signed and Sealed this

Seventeenth Day of October, 2006

JON W. DUDAS
*Director of the United States Patent and Trademark Office*